UNITED STATES PATENT OFFICE.

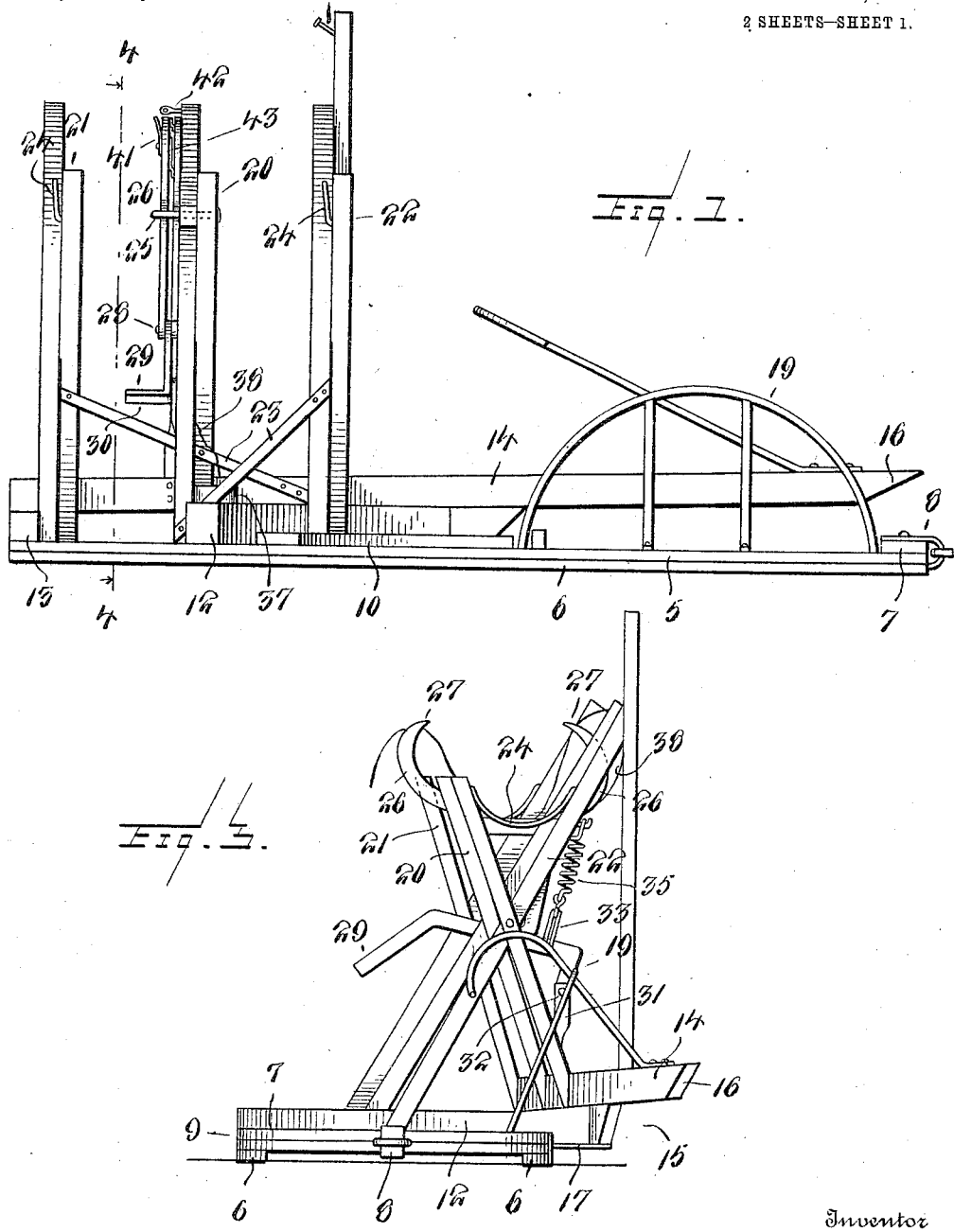

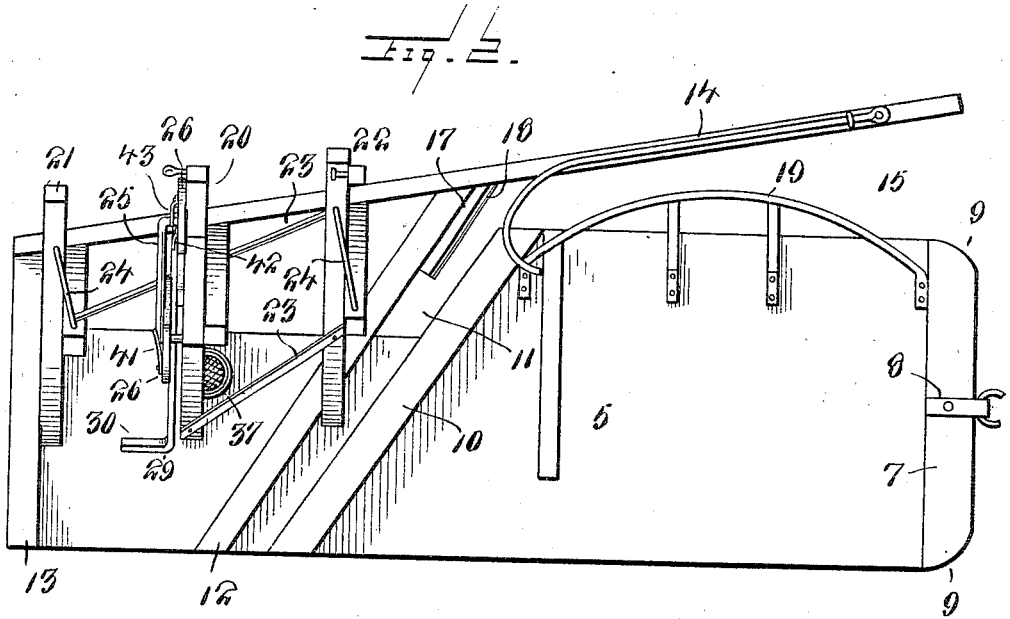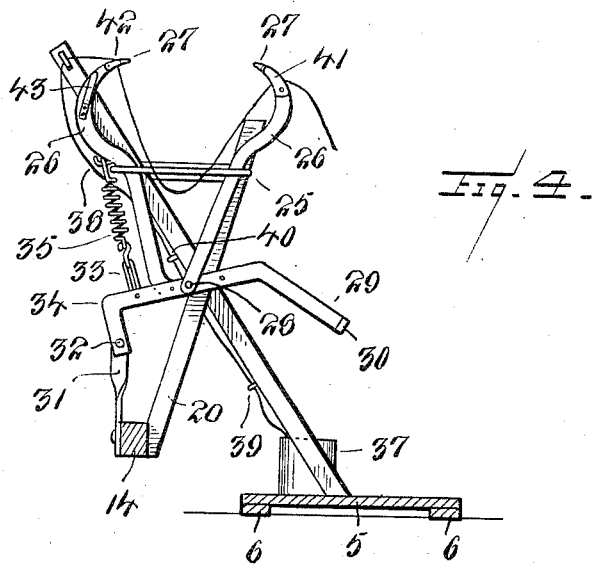

FRED H. PETTIT, OF ANTHON, OKLAHOMA.

CORN-HARVESTING MACHINE.

1,051,257.

Specification of Letters Patent. Patented Jan. 21, 1913.

Application filed February 24, 1912. Serial No. 679,574.

*To all whom it may concern:*

Be it known that I, FRED H. PETTIT, a citizen of the United States, residing at Anthon, in the county of Custer and State of Oklahoma, have invented new and useful Improvements in Corn-Harvesting Machines, of which the following is a specification.

The invention relates to a stalk bundling implement, and more particularly to the class of stalk bundling sleds.

The primary object of the invention is the provision of an implement of this character in which standing corn stalks or growing plants after having been severed and caught may be tied in bunches, during the advancement of the implement through a field, thus avoiding the necessity of manually handling the stalks or plants as is usual.

Another object of the invention is the provision of an implement of this character in which the severed corn stalks may be held in bunch form and wrapped with twine for holding the bunches together, whereby they may be distributed in this manner in the field.

A further object of the invention is the provision of an implement of this character which is simple in construction, thoroughly reliable and efficient in its purpose, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a side elevation of an implement constructed in accordance with the invention. Fig. 2 is a top plan view thereof. Fig. 3 is a front elevation. Fig. 4 is a sectional view on the line 4—4 of Fig. 1, looking in the direction of the arrow.

Similar reference characters indicate corresponding parts throughout the several views of the drawings.

Referring to the drawings by numerals, the implement comprises a platform 5 provided with suitable longitudinally disposed cleats 6 forming runners, although these may be dispensed with. Thus, the platform will serve as a sled, whereby the same may be drawn over the ground for the advancement of the implement, the said platform 5 being provided, at its front end, with a cross beam 7 provided with a central opening, in which is pivoted a clevis 8, to which the draft appliance is to be attached, for the hitching of an animal or animals thereto, whereby the sled may be drawn over the ground. The forward end of the platform is rounded to provide a tapered front end 9 which permits the free progress of the sled and avoids the impeding of the movement thereof by contacting with obstructions in its path of travel.

Fixed to the upper face of the platform 5, intermediate the ends thereof, is a diagonally disposed reinforcing bar 10, the said platform being cut-away at one side, as at 11, the cut-away portion extending from the rear end of said platform to the bar 10, thereby forming a gap in one side of the platform. Fixed to the platform 5, rearwardly of and spaced from the bar, but in parallelism therewith, is a cutting element supporting beam 12 which is of slightly greater length than the bar 10, so as to protrude a distance beyond one side edge of the platform 5 and to overhang the cut-away portion 11 therein.

Fixed to the rear end of the platform 5, at the upper side thereof, is a cross beam 13, the same being extended so as to overhang the cut-away portion 11 in the platform, and to this beam 13 and the said beam 12 is fixed a forwardly extending angularly disposed guide beam 14, providing an entrance passage 15 between it and the side edge adjacent thereto of the platform, the forward end of the guide beam 14 being rearwardly beveled, as at 16, so as to prevent any possibility of the beam cutting into the ground, during the forward advancement of the sled, the said guide beam 14 being disposed at a slight rearward inclination, so that its front beveled end 16 will be slightly elevated above its rear end to clear the ground on the travel of the implement. The passage 15 permits the standing corn stalks to pass between the guide beam 14 and the platform 5 at one side thereof, so as to enter the cut-away portion 11 in the platform between the bar 10 and the cutting element supporting beam 12 for the severing of the standing stalks by the cutting element, presently described.

Fixed to the under face of the end of the supporting beam 12, overhanging the cutaway portion 11, is the cutting element, comprising a plate or blade 17, the forward edge being beveled, as at 18, to provide a front cutting edge which severs the standing stalks from the ground, as the sled is advanced through a field.

Fixed to the platform 5, forwardly of the bar 10, is a laterally inclined upwardly extending arcuate-shaped fender frame 19 which forces the corn stalks, when entering the passage 15, over onto the said platform, to be subsequently picked up and placed in the holding element, presently described. Mounted upon the platform, rearwardly of the beam 12, is what might be commonly termed "a horse", comprising spaced intermediate, rear and forward cross standards 20, 21 and 22, the same being suitably connected together at their crossing points, the lower ends of the standards being fixed to the platform 5 and the guide beam 14 between the beams 12 and 13, carried by the said platform. To strengthen the standards of the horse, there are suitably arranged brace irons 23 fixed thereto in any suitable manner.

Fixed to the standards, near the upper ends thereof, are downwardly bowed supporting wires 24, on which are to be placed the severed stalks for holding the same bunched after being cut from the ground.

Carried by the pair of intermediate standards 20 and elevated above the crossing point thereof, is an elongated guide loop 25, through which are passed the swinging grab arms 26, the upper ends of which are formed with reversely curved grab jaws 27, the lower end of one arm being pivoted, as at 28, to a foot actuated lever 29, one end thereof being downturned to provide a foot pedal 30, while its opposite end is downturned and is connected to a vertical post 31 by means of a pivot 32, the post being fixed to the guide beam 14. The other arm 26 is pivoted to said lever and works in the guide loop 25, so that when the lever 29 is raised, the arms will separate from each other, thereby opening the jaws 27, but on depressing the lever 29, the arms will swing together for closing the jaws, the lever 29 being formed with an extension piece 34 which may be either integral therewith or secured thereto. Connected to the horse is one end of a coiled retractile spring 35 which has its opposite end connected with a link 33 which is loosely connected to the lever 29, the spring 35 being designed to elevate the lever 29, thereby normally holding the arms separated and the jaws 27 in open position, so that the corn stalks, when severed, may be placed in the horse between the jaws 27 to be grabbed thereby on the closing of the same, for the bunching of the stalks, whereby they may be tied in a bunch, in a manner presently described.

Mounted upon the platform 5, between the intermediate and forward standards 20 and 22, is a twine box 37 adapted to contain a ball of twine 38, the same being trained upwardly through suitable guide eyes 39 and 40 and caught by devices carried by the jaws 27, which devices will be presently described. On one of the jaws 27 is mounted one of the devices, which comprises a spring finger 41, in which is engaged the loose end portion of the twine, while on the other jaw is mounted the other device which comprises a grab finger 42, and over this finger is trained the twine 38, so that when the jaws are in open position, the portion of the twine between the open jaws will underlie the bunch of severed stalks resting in the horse, and upon closing the jaws the twine will be wrapped about the bunch of stalks, and the grab finger 42 will engage the twine for holding it. On the arm 26 spaced from the finger 42 is a cutting blade 43, so that the twine, after being tied in a knot about the bunch of stalks, can be cut by the knife blade 43, and thereafter the tied bunch of stalks may be thrown upon the ground. The operation of the device just referred to is repeated each time a bunch of stalks is placed in the horse. The lever 29 is operated by the foot of a person at the required intervals, as will be obvious. Also the horse may be removed from the platform and two boards fastened to the bottom, should it be desired, so that said horse may stand upon the ground, for the bunching of stalks delivered thereto.

What is claimed is:

1. A stalk bundling device comprising crossed standards arranged in spaced pairs and rising from a support, downwardly bowed supporting members connected to the standards above the crossing points thereof for supporting stalks when deposited thereon, swinging grab arms, a guide loop mounted upon one pair of standards and receiving the said arms, a foot operated lever pivotally supported above such support the said arms being pivoted to the lever, and twine feeding mechanism coöperative with the arm whereby on the bunching of material by the latter the twine will be wrapped about the bunch.

2. A stalk bundling device comprising crossed standards arranged in spaced pairs and rising from a support, downwardly bowed supporting members connected to the standards above the crossing points thereof for supporting stalks when deposited thereon, swinging grab arms, a guide loop mounted upon one pair of standards and receiving the said arms, a foot operated lever pivotally supported above such support the said arms being pivoted to the lever, twine feeding mechanism coöperating with the arm whereby on the bunching of material by the latter the twine will be wrapped about the bunch, and means connected with one of the standards and lever for normally elevating
5 the latter to hold the arms in position for receiving the matter delivered between the same.

In testimony whereof I affix my signature in presence of two witnesses.

FRED H. PETTIT.

Witnesses:
GEORGE EPPERLY,
W. A. BLAIR.

Copies of this patent may be obtained for five cents each, by addressing the "Commissioner of Patents, Washington, D. C."